United States Patent Office 3,192,273
Patented June 29, 1965

3,192,273
STABILIZATION OF METHYLCHLOROFORM
William E. Bissinger, Akron, Ohio, assignor to Pittsburgh Plate Glass Company, Pittsburgh, Pa., a corporation of Pennsylvania
No Drawing. Filed Aug. 14, 1961, Ser. No. 131,071
10 Claims. (Cl. 260—652.5)

This application is a continuation-in-part of application Serial No. 857,271, filed December 4, 1959.

This invention deals with methylchloroform, being especially concerned with the protection of methylchloroform against decomposition, degradation and corrosive action on metals. It more particularly relates to methylchloroform compositions of enhanced stability.

Methylchloroform, 1,1,1-trichloroethane, is a normally liquid chlorinated hydrocarbon useful for a variety of purposes as an industrial solvent. It is a useful liquid phase degreasing solvent for cleaning metal articles contaminated with greases, oils and the like. Because of its strong tendency to decompose, its use for this purpose has limitations. Within all too short a period of use, it deteriorates to an extent that its value is lost. Especially with light metals such as aluminum, magnesium and their alloys and in the presence of trace amounts of water, the decomposition is alarmingly rapid.

Other applications of methylchloroform include its use as a vapor pressure depressant in conjunction with aerosols and as a vapor phase degreasing solvent. In these applications, the corrosiveness and/or instability of methylchloroform is a vital consideration. Thus, its practical value as a vapor depressant depends upon minimizing corrosion of the metal container for the aerosol. For its use as a vapor phase degreasing solvent with metals to be economically justified, methylchloroform tendency to decompose must be retarded.

It has now been discovered that methylchloroform may be stabilized so as to reduce or eliminate its aforementioned limitations regarding instability and corrosiveness. Thus, the present invention provides methylchloroform of enhanced stability and other valued properties. These and other improvements are realized by incorporating in methylchloroform minor amounts of a lower aliphatic saturated alcohol, notably tertiary-butyl alcohol, 2-methyl-3-butyn-2-ol and 1,4-dioxane. Other materials may also be included in the methylchloroform such as alkyl-amino phosphates or phosphites, e.g., the reaction product of (3-methylbutyl) (2-ethylhexyl) phosphoric acid and an amine such as dicyclohexylamine or a fatty amine such as decylamine, dodecylamine, hexadecylamine or octadecylamine.

When tertiary-butyl alcohol, 2-methyl-3-butyn-2-ol and 1,4-dioxane are simultaneously employed, the methylchloroform evidences exceptional stability. Moreover, in accordance with a preferred embodiment hereof, the 1,4-dioxane concentration is less than about 0.7 percent, usually no greater than 0.5 percent, by weight of the methylchloroform. As little as 0.1, usually at least 0.2 percent by weight of 1,4-dioxane is useful. Used alone and at these or even greater concentrations, 1,4-dioxane is ineffective for comparable purposes. Apparently, co-action between the components is responsible for effective stabilization.

The following example illustrates this invention and demonstrates the unique coaction of the additives in stabilizing methylchloroform.

EXAMPLE I

A series of tests are conducted by a procedure in which an aluminum strip is immersed completely in a glass beaker filled with methylchloroform. With the strip covered by the methylchloroform, it is scratched. While at room temperature of 25° C., the contents of the flask are observed ot determine evolution of gas, formation of dark precipitate, and discoloration of both the strip and methylchloroform. Evolution of gas and discoloration (both of the methylchloroform and strip) within short periods of time indicate instability.

The following table records results with methylchloroform and methylchloroform containing specified additives:

*Table I*

| Composition | Additive concentration, percent by weight | | | Test results |
|---|---|---|---|---|
| | 1,4-dioxane | t-butanol | 2-methyl-3-butyn-2-ol | |
| A | | | | Failure—Prompt evolution of gas; solvent blackens into tarry mass in 30 minutes. |
| B | 0.5 | | | Failure—Prompt evolution of gas; solvent blackens into tarry mass after short period of time. |
| C | | 1.5 | | Do. |
| D | | | 1.5 | Do. |
| E | 0.5 | 1.5 | | Failure—Prompt evolution of gas; solvent blackens after several hours. |
| F | | 1.5 | 1.5 | Do. |
| G | 0.5 | | 1.5 | Failure—Prompt evolution of gas; Solvent blackens after about one hour. |
| H | 0.5 | 1.5 | 1.5 | After 24 hours, the solvent is still clear. |

An ideal saturated aliphatic alcohol component for this stabilizing system is tertiary-butyl alcohol. Nevertheless, other saturated monohydric alcohols of 1 to 8 carbons including methanol, ethanol, n-propanol, isopropanol, n-butanol, n-amyl alcohol, tertiary-amyl alcohol, hexanol, octanol and mixtures thereof are of value as illustrated by the data in the following example. Those with 3 to 5 carbon atoms are preferred.

EXAMPLE II

A series of tests were conducted using the test procedure described in Example I with the following results:

Table II

| Compo-sition | Additive concentration, percent by weight | | | Test Results |
|---|---|---|---|---|
| | 1,4-dioxane | Alcohol (percent) | 2-methyl-3-butyn-2-ol | |
| I | 0.5 | Methanol (3) | | Decomposed grossly in less than 24 hours. |
| J | | do | 1.5 | Decomposed promptly. |
| K | 0.5 | do | 1.5 | After 24 hours, only very minor signs of degradation. |
| L | 0.5 | Ethanol (3) | | Decomposed grossly in 3 hours. |
| M | | do | 1.5 | Decomposed grossly in 4 hours. |
| N | 0.5 | do | 1.5 | After 24 hours, only very minor signs of degradation. |
| O | 0.5 | Ethanol (1.5) | 1.5 | Do. |
| P | 0.5 | n-Propanol (3) | 1.5 | Clear after 24 hours. |
| Q | 0.5 | n-Propanol (1.5) | 1.5 | After 24 hours, only very minor signs of degradation. |
| R | 0.5 | Isopropanol (3) | 1.5 | Clear after 24 hours. |
| S | | do | 1.5 | Decomposed grossly in 3 hours. |
| T | 0.5 | n-butanol (3) | | Decomposed grossly in 2 hours. |
| U | | do | 1.5 | Decomposed grossly in 3 hours. |
| V | 0.5 | do | 1.5 | Some discoloration after 24 hours. |
| W | 0.5 | n-Butanol (1.5) | 1.5 | Do. |
| X | 0.5 | t-Amyl alcohol (1.5) | | Gross decomposition. |
| Y | | do | 1.5 | Do. |
| Z | 0.5 | do | 1.5 | Some discoloration after 24 hours. |

Usually, the concentration of tertiary-butanol or like saturated alcohol is between 0.5 and 3.0 percent, ideally about 1.5 percent, by weight of the methylchloroform. Higher or lower concentrations are not, however, precluded. Corresponding concentrations of the 2-methyl-3-butyn-2-ol are usual.

While the invention has been described by reference to specific details of certain embodiments, it is not intended to limit the invention to such details except insofar as they appear in the claims.

I claim:

1. Methylchloroform containing in stabilizing concentration 2-methyl-3-butyn-2-ol, a 1 to 8 carbon atom alkanol and 1,4-dioxane, the individual concentration of said 1,4-dioxane being below that at which it alone stabilizes effectively the methylchloroform.

2. Methylchloroform containing in minor concentration a 3 to 5 carbon atom alkanol, 2-methyl-3-butyn-2-ol and less than 0.7 weight percent 1,4-dioxane.

3. Methylchloroform containing in stabilizing concentration 2-methyl-3-butyn-2-ol, a 1 to 8 carbon atom alkanol and 1,4-dioxane, the concentration of said 1,4-dioxane being less than 0.7 percent by weight of the methylchloroform.

4. Stabilized methylchloroform containing minor concentrations of 2-methyl-3-butyn-2-ol, tertiary-butanol and 1,4-dioxane, the individual concentration of said 1,4-dioxane being below that at which it alone stabilizes effectively the methylchloroform.

5. Stabilized methylchloroform containing from 0.5 to 3 percent by weight 2-methyl-3-butyn-2-ol, from 0.5 to 3 percent by weight tertiary-butanol and 1,4-dioxane, the concentration of said dioxane being less than 0.7 percent by weight of the methylchloroform.

6. Stabilized methylchloroform containing minor contrations of 2-methyl-3-butyn-2-ol, isopropanol and 1,4-dioxane, the individual concentration of said 1,4-dioxane being below that at which it alone stabilizes effectively the methylchloroform.

7. Stabilized methylchloroform containing minor concentrations of 2-methyl-3-butyn-2-ol, n-butanol and 1,4-dioxane, the individual concentration of said 1,4-dioxane being below that at which it alone stabilizes effectively the methylchloroform.

8. Stabilized methylchloroform containing from 0.5 to 3 percent by weight 2-methyl-3-butyn-2-ol, from 0.5 to 3 percent by weight t-amyl alcohol and 1,4-dioxane, the concentration of said dioxane being less than 0.7 percent by weight of the methylchloroform.

9. Stabilized methylchloroform containing minor concentrations of 2-methyl-3-butyn-2-ol, n-propanol and 1,4-dioxane, the individual concentration of said 1,4-dioxane being below that at which it alone stabilizes effectively the methylchloroform.

10. Methylchloroform containing in minor cooperative stabilizing concentration a 3 to 5 carbon atom alkanol, 2-methyl-3-butyn-3-ol and 1,4-dioxane, the individual concentration of said 1,4-dioxane being below that at which it alone stabilizes effectively the methylchloroform.

References Cited by the Examiner

UNITED STATES PATENTS

| 2,371,644 | 3/45 | Petering et al. | 260—652.5 |
| 2,775,624 | 2/56 | Skeeters et al. | 260—652.5 |
| 2,803,676 | 8/57 | Willis et al. | 260—652.5 |
| 2,811,252 | 10/57 | Bachtel | 260—652.5 |
| 2,838,458 | 6/58 | Bachtel | 260—652.5 |
| 2,905,726 | 9/59 | Leathers et al. | 260—652.5 |
| 2,923,747 | 2/60 | Rapp | 260—652.5 |
| 3,000,978 | 9/61 | Fredenburg | 260—652.5 |

LEON ZITVER, *Primary Examiner.*

ALPHONSO D. SULLIVAN, JOSEPH R. LIBERMAN,
*Examiners.*